(12) United States Patent
Wittkopp et al.

(10) Patent No.: US 7,946,945 B1
(45) Date of Patent: May 24, 2011

(54) MULTI-SPEED TRANSMISSION WITH EXTERNAL DRIVE GEARSETS

(75) Inventors: Scott H. Wittkopp, Ypsilanti, MI (US);
Andrew W. Phillips, Rochester, MI (US); James M. Hart, Belleville, MI (US); Clinton E. Carey, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/987,757

(22) Filed: Jan. 10, 2011

Related U.S. Application Data

(63) Continuation of application No. 12/196,927, filed on Aug. 22, 2008, now Pat. No. 7,871,349.

(51) Int. Cl.
*F16H 37/02* (2006.01)
(52) U.S. Cl. ........................................... 475/218
(58) Field of Classification Search ................... None
See application file for complete search history.

(56) References Cited

U.S. PATENT DOCUMENTS

| | | | | |
|---|---|---|---|---|
| 7,695,391 | B2 * | 4/2010 | Phillips et al. | 475/218 |
| 7,717,819 | B2 * | 5/2010 | Wittkopp et al. | 475/218 |
| 2009/0082157 | A1 * | 3/2009 | Wittkopp et al. | 475/218 |
| 2009/0082158 | A1 * | 3/2009 | Wittkopp et al. | 475/218 |
| 2009/0082159 | A1 * | 3/2009 | Phillips et al. | 475/218 |
| 2009/0082160 | A1 * | 3/2009 | Phillips et al. | 475/218 |
| 2009/0082163 | A1 * | 3/2009 | Phillips et al. | 475/275 |
| 2009/0082164 | A1 * | 3/2009 | Wittkopp et al. | 475/276 |
| 2009/0082165 | A1 * | 3/2009 | Phillips et al. | 475/276 |
| 2009/0082166 | A1 * | 3/2009 | Wittkopp et al. | 475/311 |
| 2009/0082167 | A1 * | 3/2009 | Wittkopp et al. | 475/311 |
| 2009/0118061 | A1 | 5/2009 | Wittkopp et al. | |

* cited by examiner

*Primary Examiner* — Dirk Wright

(57) ABSTRACT

A transmission is provided having an input member, an output member, three planetary gear sets, four external gear sets, a plurality of coupling members and a plurality of torque transmitting devices. Each of the planetary gear sets includes first, second and third members. Each of the external gear sets includes first and second members. The torque transmitting devices may include clutches and brakes.

20 Claims, 2 Drawing Sheets

| GEAR STATE | GEAR RATIO | RATIO STEP | CLUTCHING ELEMENTS ||||| 
|---|---|---|---|---|---|---|---|
| | | | 48 | 42 | 44 | 40 | 46 |
| REV | -2.958 | | X | | | | X |
| N | | -0.63 | O | | | | |
| 1ST | 4.694 | | X | | | X | |
| 2ND | 3.092 | 1.52 | X | X | | | |
| 3RD | 2.489 | 1.24 | X | | X | | |
| 4TH | 1.719 | 1.45 | | X | X | | |
| 5TH | 1.197 | 1.44 | | | X | X | |
| 6TH | 1.007 | 1.19 | | | X | | X |
| 7TH | 0.845 | 1.19 | | | | X | X |
| 8TH | 0.672 | 1.26 | | X | | | X |

X = ON - ENGAGED CARRYING TORQUE
O = ON - ENGAGED NOT CARRYING TORQUE

MULTI-SPEED TRANSMISSION WITH EXTERNAL DRIVE GEARSETS

CROSS-REFERENCE TO RELATED APPLICATIONS

This application is a continuation of U.S. application Ser. No. 12/196,927 filed on Aug. 22, 2008, which claims the benefit of U.S. Provisional Application No. 60/985,899, filed on Nov. 6, 2007. The disclosure of the above application is incorporated herein by reference.

FIELD

The invention relates generally to a multiple speed transmission having a plurality of gear sets and a plurality of torque transmitting devices, and more particularly to a transmission having eight or more speeds produced by a combination of planetary gear sets, external gear sets and torque transmitting devices.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, three planetary gear sets, four external gear sets, a plurality of coupling members and a plurality of torque transmitting devices. Each of the planetary gear sets includes first, second and third members. Each of the external gear sets include first and second gear members. The torque transmitting devices are for example clutches and brakes. Five torque transmitting mechanisms are selectively engageable to interconnect one of the first members, second members, third members, first gears, and second gears with at least one other of the first members, second members, third members, first gears, second gears, and a stationary element. The torque transmitting mechanisms are selectively engageable in combinations of at least two to establish at least eight forward speed ratios and at least one reverse speed ratio between the input member and the output member.

An embodiment of the transmission includes three planetary gear sets, four external drive gear sets, four clutches and one brake.

It is thus an aspect of the present invention to provide a transmission having three planetary gear sets and four external drive gear sets.

It is a further aspect of the present invention to provide a transmission having at least eight forward speeds and at least one reverse.

In yet another embodiment, a transmission is provided having an input member, an output member, three planetary gear sets, four external gear sets, a plurality of coupling members and a plurality of torque transmitting devices. The first, second, and third planetary gear sets each having a sun gear, a carrier member, and a ring gear. The first, second, third, and fourth co-planar gear set each having a first gear intermeshed with a second gear and the input member is continuously interconnected with the first gear of at least one of the first, second, and third co-planar gear sets and the output member is continuously interconnected with the second gear of the fourth co-planar gear set. Further, a first torque transmitting mechanism is selectively engageable to interconnect the sun gear of the third planetary gear set with the second gear of the first co-planar gear set. A second torque transmitting mechanism is selectively engageable to interconnect the sun gear of the third planetary gear set with at least one of the sun gear of the first planetary gear set and the second gear of the second co-planar gear set. A third torque transmitting mechanism is selectively engageable to interconnect the carrier member of the first planetary gear set with the second gear of the third co-planar gear set. A fourth torque transmitting mechanism is selectively engageable to interconnect the ring gear of the third planetary gear set with the carrier member of the first planetary gear set. A fifth torque transmitting mechanism is selectively engageable to interconnect the ring gear of the third planetary gear set with the stationary element. The torque transmitting mechanisms are selectively engageable in combinations of at least two to establish at least eight forward speed ratios and at least one reverse speed ratio between the input member and the output member.

Further aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting elements in each of the available forward and reverse speeds or gear ratios of the transmission illustrated in FIG. 2.

DETAILED DESCRIPTION

The following description is merely exemplary in nature and is not intended to limit the present disclosure, application, or uses.

Figure 1:
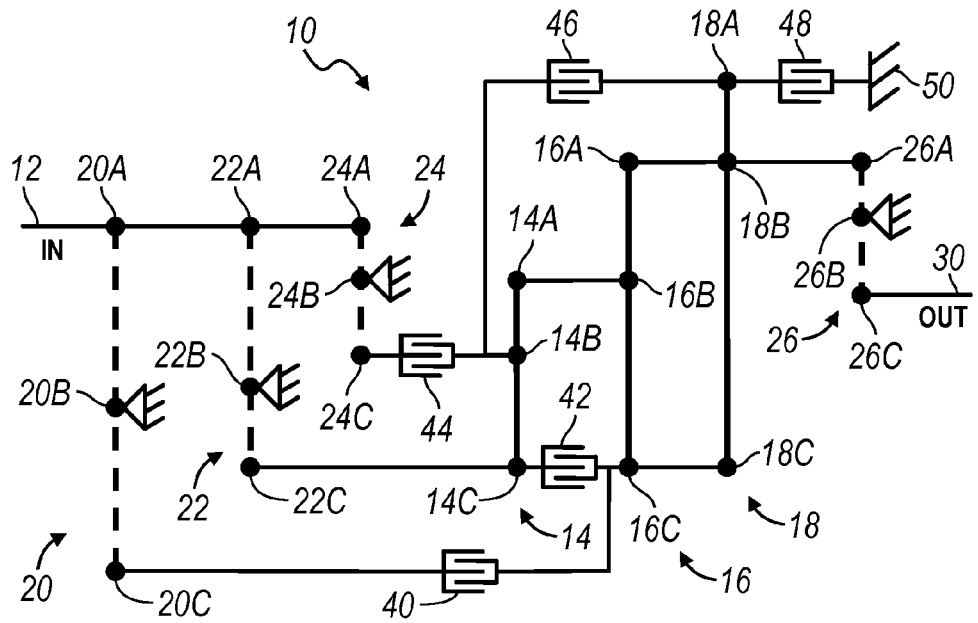
FIG. 1 is a lever diagram of an embodiment of an eight speed transmission according to the present invention.

Referring now to FIG. 1, an embodiment of an eight speed transmission 10 is illustrated in a lever diagram format. A lever diagram is a schematic representation of the components of a mechanical device such as an automatic transmission. Each individual lever represents a gear set. Solid line levers represent a planetary gear set wherein the three basic mechanical components of the planetary gear set are each represented by a node. Therefore, a single planetary gear set lever contains three nodes: one for the sun gear, one for the planet gear carrier, and one for the ring gear. Dashed line levers are spur or external drive gear sets which may be represented in the lever diagram as planetary gear sets having grounded planet carrier members. Accordingly, the outer nodes represent the first and second drive gears and the inner node represents the imaginary grounded planet carrier members. The relative length between the nodes of each lever can be used to represent the ring-to-sun ratio and first drive gear to second drive gear ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. Where the torque transmitting device is a brake, one set of interleaved fingers is coupled to a ground. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a first external gear set 20 having three nodes: a first node 20A, a second node 20B and a third node 20C, a second external gear set 22 having three nodes: a first node 22A, a second node 22B and a third node 22C, a third external gear set 24 having three nodes: a third node 24A, a second node 24B and a third node 24C, a fourth external gear set 26 having three nodes: a first node 26A, a second node 26B and a third node 26C, and an output shaft or member 30.

The input member 12 is coupled to the first node 20A of the first external gear set 20, first node 22A of the second external gear set 22, first node 24A of the third external gear set 24. The output member 30 is coupled to the third node 26C of the fourth external gear set 26. The first node 14A of the first planetary gear set 14 is coupled to the second node 16B of the second planetary gear set 16. The third node 14C of the first planetary gear set 14 is coupled to the third node 22C of the second external gear set 22. The first node 16A of the second planetary gear set 16 is coupled to the second node 18B of the third planetary gear set 18. The third node 16C of the second planetary gear set 16 is coupled to the third node 18C of the third planetary gear set 18. The second node 18B of the third planetary gear set 18 is coupled to the first node 26A of the fourth external gear set 26.

A first clutch 40 selectively connects the third node 16C of the third planetary gear set 16 to the third node 20C of the first external gear set 20. A second clutch 42 selectively connects the third node 14C of the first planetary gear set 14 to the third node 16C of the second planetary gear set 16. A third clutch 44 selectively connects the second node 14B of the first planetary gear set 14 to the third node 24C of the third external gear set 24. A fourth clutch 46 selectively connects the second node 14B of the first planetary gear set 14 to the first node 18A of the third planetary gear set 18. A brake 48 selectively connects the first node 18A of the third planetary gear set 18 to a stationary element or transmission housing 50.

Figure 2:
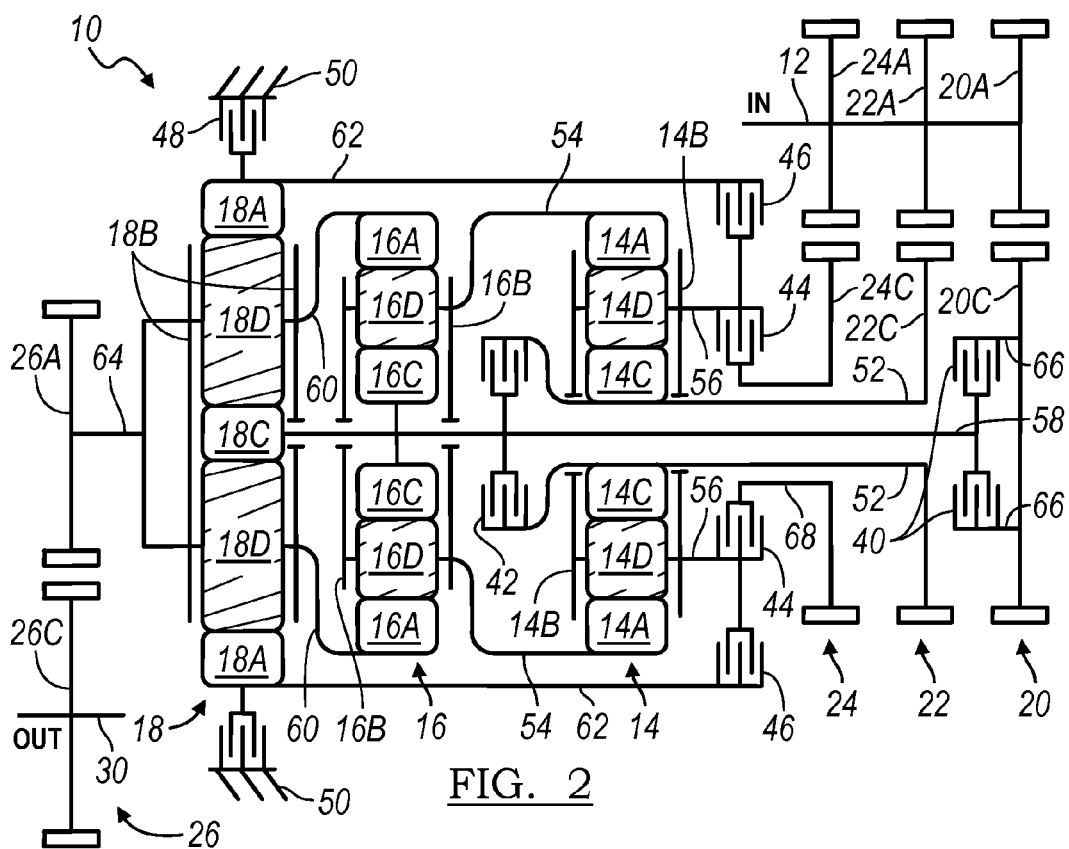
FIG. 2 is a diagrammatic representation of an embodiment of an eight speed transmission according to the present invention.

Referring now to FIG. 2, a schematic diagram illustrates an embodiment of the eight speed transmission 10 according to the present invention. In FIG. 2, the numbering from the lever diagram of FIG. 1 is carried over. The clutches, brakes, and couplings or interconnections are correspondingly presented whereas the nodes of the planetary gear sets now appear as components of planetary gear sets such as sun gears, ring gears, planet gears and planet gear carriers and the nodes of the external drive gear sets now appear as components of the external drive gear sets such as first and second drive or spur gears.

For example, planetary gear set 14 includes a sun gear member 14C, a planet gear carrier member 14B and a ring gear member 14A. The planet gear carrier member 14B rotatably supports a set of planet gears 14D configured to intermesh with both the sun gear member 14C and the ring gear member 14A. The sun gear member 14C is connected for common rotation with a first shaft or interconnecting member 52. The ring gear member 14A is connected for common rotation with a second shaft or interconnecting member 54. The planet carrier member 14B is connected for common rotation with a third shaft or interconnecting member 56.

The planetary gear set 16 includes a sun gear member 16C, a planet gear carrier member 16B and a ring gear member 16A. The planet gear carrier member 16B rotatably supports a set of planet gears 16D configured to intermesh with both the sun gear member 16C and the ring gear member 16A. The sun gear member 16C is connected for common rotation with a fourth shaft or interconnecting member 58. The ring gear member 16A is connected for common rotation with a fifth shaft or interconnecting member 60. The planet carrier member 16B is connected for common rotation with the second shaft or interconnecting member 54.

The planetary gear set 18 includes a sun gear member 18C, a planet gear carrier member 18B and a ring gear member 18A. The planet gear carrier member 18B rotatably supports a set of planet gears 18D configured to intermesh with both the sun gear member 18C and the ring gear member 18A. The sun gear member 18C is connected for common rotation with a fourth shaft or interconnecting member 58. The ring gear member 18A is connected for common rotation with a sixth shaft or interconnecting member 62. The planet carrier member 18B is connected for common rotation with fifth shaft or interconnecting member 60 and with a seventh shaft or interconnecting member 64.

The external gear set 20 includes a first gear member 20A intermeshed with a second gear member 20C. The first gear member 20A is connected for common rotation with the input shaft or member 12. The second gear member 20C is connected for common rotation with an eighth shaft or interconnecting member 66.

The external gear set 22 includes a first gear member 22A intermeshed with a second gear member 22C. The first gear member 22A is connected for common rotation with the input shaft or member 12. The second gear member 22C is connected for common rotation with the first shaft or interconnecting member 52.

The external gear set 24 includes a first gear member 24A intermeshed with a second gear member 24C. The first gear member 24A is connected for common rotation with the input shaft or member 12. The second gear member 24C is connected for common rotation with a ninth shaft or interconnecting member 68.

The external gear set 26 includes a first gear member 26A intermeshed with a second gear member 26C. The first gear member 26A is connected for common rotation with seventh interconnecting member 64. The second gear member 26C is connected for common rotation with the output shaft or member 30.

The input shaft or member 12 is continuously connected to an engine (not shown) or to a turbine of a torque converter (not shown). The output shaft or member 30 is continuously connected with the final drive unit or transfer case (not shown).

The torque-transmitting elements or the clutches 40, 42, 44, 46 and brake 48 allow for selective interconnection of the shafts or interconnecting members, members of the planetary gear sets and external gear sets, and the transmission housing 50. For example, the first clutch 40 is selectively engageable to connect fourth interconnecting member 58 with the eighth interconnecting member 66. The second clutch 42 is selectively engageable to connect the first interconnecting member 52 with the fourth interconnecting member 58. The third clutch 44 is selectively engageable to connect the third interconnecting member 56 with the ninth interconnecting member 68. The fourth clutch 46 is selectively engageable to connect the third interconnecting member 56 with the sixth interconnecting member 62. The brake 48 is selectively engageable to connect the sixth interconnecting member 62 to a stationary element or the transmission housing 50 in order to restrict the sixth interconnecting member 62 and therefore the ring gear member 18A from rotating relative to the transmission housing 50.

In the particular example provided, the transmission 10 is arranged along three parallel and spaced apart axes including a first axis defined by the input shaft or member 12, a second axis defined by the fourth interconnecting member 58 and the seventh interconnecting member 64, and a third axis defined by the output member 30. Accordingly, in the present embodiment, the first gear member 20A, the first gear member 22A, and the first gear member 24A are all coaxial with the first axis. The interconnecting members 52, 54, 56, 58, 60, 62, 64, 66, and 68, the second gear member 20C, the second gear member 22C, the second gear member 24C, the first gear member 26A, the first clutch 40, the second clutch 42, the third clutch 44, the fourth clutch 46, brake 48 and the planetary gear sets 14, 16, and 18 are all coaxial with the second axis. Finally, the second gear member 26C is coaxial with the third axis. Additionally, the transmission 10 is preferably configured for a front wheel drive vehicle.

Referring now to FIG. 3, the operation of the embodiments of the eight speed transmission 10 will be described. It will be appreciated that the transmission 10 is capable of transmitting torque from the input shaft or member 12 to the output shaft or member 30 in at least eight forward speed or torque ratios and at least one reverse speed or torque ratio. Each forward and reverse speed or torque ratio is attained by engagement of one or more of the torque-transmitting mechanisms (i.e. first clutch 40, second clutch 42, third clutch 44, fourth clutch 46, and brake 48), as will be explained below. FIG. 3 is a truth table presenting the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the fourth clutch 46 and the brake 48 are engaged or activated. The fourth clutch 46 connects the third interconnecting member 56 with the sixth interconnecting member 62. The brake 48 connects the sixth interconnecting member 62 to stationary element or the transmission housing 50 in order to restrict the sixth interconnecting member 62 and therefore the ring gear member 18A of the third planetary gear set 18 from rotation relative to the transmission housing 50. Likewise, the eight forward ratios are achieved through different combinations of clutch and brake engagement, as shown in FIG. 3.

It will be appreciated that the foregoing explanation of operation and gear states of the eight speed transmission 10 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

We claim the following:

1. A transmission comprising:
   an input member;
   an output member;
   a first, second, and third planetary gear set each having a first, second, and third member;
   a first, second, third, and fourth co-planar gear set each having a first gear intermeshed with a second gear;
   a first rotary member formed by interconnecting the second gear of the second co-planar gear set and the third member of the first planetary gear set;
   a second rotary member formed by interconnecting the third members of the second and third planetary gear sets;
   a third rotary member formed by interconnecting the first member of the first planetary gear set and the second member of the second planetary gear set;
   a fourth rotary member formed by interconnecting the first member of the second planetary gear set and the second member of the third planetary gear set; and
   five torque transmitting mechanisms each selectively engageable to interconnect one of the first members, second members, third members, first gears, second gears, first rotary member, second rotary member, third rotary member, and fourth rotary member with at least one other of the first members, second members, third members, first gears, second gears, first rotary member, second rotary member, third rotary member, fourth rotary member, and a stationary element, and
   wherein the torque transmitting mechanisms are selectively engageable to establish at least eight forward speed ratios and at least one reverse speed ratio between the input member and the output member, and
   wherein at least two torque transmitting devices are disengaged in each of the at least eight forward speed ratios and the at least one reverse speed ratio.

2. The transmission of claim 1 wherein the first members are ring gears, the second members are carrier members, and the third members are sun gears.

3. A transmission comprising:
   an input member;
   an output member;
   a first, second, and third planetary gear set each having a first, second, and third member;
   a first, second, third, and fourth co-planar gear set each having a first gear intermeshed with a second gear;
   at least four rotary members formed by interconnecting at least one of the first members, second members, third members, fourth members, first gears, and second gears with another of the first members, second members, third members, fourth members, first gears, and second gears;
- a first torque transmitting mechanism selectively engageable to interconnect the third member of the third planetary gear set with the second gear of the first co-planar gear set;
- a second transmitting mechanism selectively engageable to interconnect the third member of the third planetary gear set with at least one of the third member of the first planetary gear set and the second gear of the second co-planar gear set;
- a third torque transmitting mechanism selectively engageable to interconnect the second member of the first planetary gear set with the second gear of the third co-planar gear set;
- a fourth torque transmitting mechanism selectively engageable to interconnect the first member of the third planetary gear set with the second member of the first planetary gear set; and
- a fifth torque transmitting mechanism selectively engageable to interconnect the first member of the third planetary gear set with the stationary element, and
- wherein the torque transmitting mechanisms are selectively engageable to establish at least eight forward speed ratios and at least one reverse speed ratio between the input member and the output member, and
- wherein at least three torque transmitting mechanisms are disengaged in each of the at least eight forward speed ratios and the at least one reverse speed ratio.

4. The transmission of claim 3 wherein one of the at least one reverse speed ratios is achieved by engagement of the fourth and fifth torque transmitting mechanisms.

5. The transmission of claim 4 wherein a first of the at least eight forward speed ratios is achieved by engagement of the first and fifth torque transmitting mechanisms.

6. The transmission of claim 5 wherein a second of the at least eight forward speed ratios is achieved by engagement of the second and fifth torque transmitting mechanisms.

7. The transmission of claim 6 wherein a third of the at least eight forward speed ratios is achieved by engagement of the third and fifth torque transmitting mechanisms.

8. The transmission of claim 7 wherein a fourth of the at least eight forward speed ratios is achieved by engagement of the second and third torque transmitting mechanisms.

9. The transmission of claim 8 wherein a fifth of the at least eight forward speed ratios is achieved by engagement of the first and third torque transmitting mechanisms.

10. The transmission of claim 9 wherein a sixth of the at least eight forward speed ratios is achieved by engagement of the third and fourth torque transmitting mechanisms.

11. The transmission of claim 10 wherein a seventh of the at least eight forward speed ratios is achieved by engagement of the first and fourth torque transmitting mechanisms.

12. The transmission of claim 11 wherein an eighth of the at least eight forward speed ratios is achieved by engagement of the second and fourth torque transmitting mechanisms.

13. The transmission of claim 3 wherein a first of the at least four rotary members is formed by interconnecting the third member of the first planetary gear set and the second gear of the second co-planar gear set, a second of the at least four rotary members is formed by interconnecting the third members of the second and third planetary gear sets, a third of the at least four rotary members is formed by interconnecting the first member of the first planetary gear set and the second member of the second planetary gear set, and a fourth of the at least four rotary members is formed by interconnecting the first member of the second planetary gear set and the second member of the third planetary gear set.

14. The transmission of claim 3 wherein the first members are ring gears, the second members are carrier members, and the third members are sun gears.

15. A transmission comprising:
- an input member;
- an output member;
- a first, second, and third planetary gear set each having a ring gear, a carrier member, and a sun gear;
- a first, second, third, and fourth co-planar gear set each having a first gear intermeshed with a second gear;
- a first, second, third, and fourth rotary member each formed by interconnecting at least two rotary elements selected from the ring gears, carrier members, sun gears, first gears, and second gears;
- a first torque transmitting mechanism selectively engageable to interconnect the second rotary member with the second gear of the first co-planar gear set;
- a second transmitting mechanism selectively engageable to interconnect the second rotary member with the first rotary member;
- a third torque transmitting mechanism selectively engageable to interconnect the carrier member of the first planetary gear set with the second gear of the third co-planar gear set;
- a fourth torque transmitting mechanism selectively engageable to interconnect the ring gear of the third planetary gear set with the carrier member of the first planetary gear set; and
- a fifth torque transmitting mechanism selectively engageable to interconnect the ring gear of the third planetary gear set with a stationary element, and
- wherein the torque transmitting mechanisms are selectively engageable to establish at least eight forward speed ratios and at least one reverse speed ratio between the input member and the output member, and
- wherein at least three torque transmitting mechanisms are disengaged in each of the at least eight forward speed ratios and the at least one reverse speed ratio.

16. The transmission of claim 15 wherein the first torque transmitting mechanism is engageable to at least partially establish at least a first, fifth, and seventh of the at least eight forward speed ratios.

17. The transmission of claim 15 wherein the second torque transmitting mechanism is engageable to at least partially establish at least a second, fourth, and eighth of the at least eight forward speed ratios.

18. The transmission of claim 15 wherein the third torque transmitting mechanism is engageable to at least partially establish at least a third, fourth, fifth and sixth of the at least eight forward speed ratios.

19. The transmission of claim 15 wherein the fourth torque transmitting mechanism is engageable to at least partially establish at least a sixth, seventh, and eighth of the at least eight forward speed ratios and at least one of the at least one reverse speed ratios.

20. The transmission of claim 15 wherein the fifth torque transmitting mechanism is engageable to at least partially establish at least a first, second, and third of the at least eight forward speed ratios and at least one of the at least one reverse speed ratios.

* * * * *